United States Patent [19]

Illston et al.

[11] Patent Number: 5,609,741

[45] Date of Patent: Mar. 11, 1997

[54] METHOD OF MANUFACTURING A COMPOSITE MATERIAL

[75] Inventors: Trevor J. Illston; Paul A. Doleman, both of Derby; Edwin G. Butler, Warwick; Peter M. Marquis, Solihull; Clive B. Ponton, Birmingham; Reza Piramoon, Coventry; Mark J. Gilbert, Birmingham, all of England

[73] Assignee: Rolls-Royce plc, London, England

[21] Appl. No.: 326,289

[22] Filed: Oct. 20, 1994

(Under 37 CFR 1.47)

Related U.S. Application Data

[63] Continuation of Ser. No. 244,077, May 22, 1994, abandoned.

[30] Foreign Application Priority Data

Nov. 22, 1991 [GB] United Kingdom ................... 9124816

[51] Int. Cl.[6] .......................... C04B 35/80; C04B 41/45; C25B 7/00
[52] U.S. Cl. ..................... 204/471; 204/479; 204/483; 204/489; 204/490; 204/491; 204/507; 204/509; 204/510
[58] Field of Search ...................... 204/471, 479, 204/483, 489, 490, 491, 507, 509, 510

[56] References Cited

U.S. PATENT DOCUMENTS

| 5,211,822 | 5/1993 | Alary et al. | 204/180.7 |
| 5,302,265 | 4/1994 | Dalzell, Jr. et al. | 204/181.5 |

OTHER PUBLICATIONS

Clasen, "Forming compacts of submicron silica particles by electroploretic deposition" (1988) Abstract only (no month).

Primary Examiner—Arun S. Phasge
Attorney, Agent, or Firm—Cushman Darby & Cushman IP Group of Pillsbury Madison & Sutro LLP

[57] ABSTRACT

A method of manufacturing a composite material in which a fibre matt is placed adjacent a plate electrode in ceramic sol. The application of an electric field to the sol via the electrode results in the deposition of sol particles on the electrode which subsequently permeate the fibre matt. The permeated fibre matt is then removed from the sol, dried out and heated to sinter the sol particles.

13 Claims, No Drawings

METHOD OF MANUFACTURING A COMPOSITE MATERIAL

This application is a continuation of application Ser. No. 08/244,007 filed May 22, 1994 now abandoned.

FIELD OF THE INVENTION

This invention relates to a method of manufacturing a composite material and is particularly concerned with a method of manufacturing a composite material using electrophoresis.

BACKGROUND OF THE INVENTION

It is well known that certain characteristics of some materials can be enhanced by reinforcing those materials with a suitably configured structure formed from a different material. In a typical example, the strength characteristics of one material can be enhanced by reinforcing that material with fibres of a different suitably strong material.

In the field of ceramics it is frequently desirable to reinforce a ceramic matrix material with high strength fibres of, for instance, alumina or silicon carbide. Difficulties arise, however, in ensuring that the reinforcing fibres are completely infiltrated by the ceramic matrix material.

One method of infiltrating reinforcing fibres with a ceramic matrix material is by the use of chemical vapour infiltration. In that technique the fibres are placed in an atmosphere of a suitable vapour which is caused to chemically break down to deposit a ceramic material on the fibres. Ceramics such as silicon carbide can be deposited in this way. However it is a slow process which is expensive to carry out. In addition-it does have a tendency to produce a matrix material which has some degree of undesirable porosity.

Another technique is one which utilises liquid phase reaction. This involves infiltrating the reinforcing fibres with a liquid which progressively oxidises or reacts with a gaseous atmosphere to form a ceramic matrix material. For instance, the fibres could be infiltrated by molten aluminium which is caused to oxidise to alumina as it infiltrates.

The drawback with this technique is that there is only a small range of materials which are suitable for use with it. Additionally there is the danger that unreacted metal could be left in the matrix material. Additionally the matrix material does tend to exhibit a certain degree of porosity.

A still further technique is one in which the reinforcing fibres are infiltrated with a liquid glass precursor material which is subsequently crystallised to form a ceramic product.

The difficulty with this technique is that:of the limited range of glass precursor materials which are available

SUMMARY OF THE INVENTION

It is an object of the present invention to provide a method of manufacturing a composite material in which such difficulties are substantially avoided.

According to the present invention, a method of manufacturing a composite-material comprises the steps of placing a porous reinforcing medium adjacent an electrode generally corresponding in shape with said porous reinforcing medium, immersing said electrodes and porous reinforcing medium in a suspension of ceramic particles, each of said ceramic particles carrying a surface charge, applying an electric field to said suspension sufficient to cause said ceramic particles to migrate to said electrode through said porous reinforcing medium and continuing the application of said electric field until ceramic particles attracted to said electrode are deposited thereon to such a depth that said deposited particles additionally substantially completely permeate said porous reinforcing medium, discontinuing said electric field, taking steps to ensure that said permeating ceramic particles remain in position within said porous reinforcing medium after the discontinuation of said electric field, removing said permeated porous medium from said electrode and from said suspension of ceramic particles and subsequently sintering said permeating ceramic particles within said porous reinforcing medium.

DETAILED DESCRIPTION OF THE INVENTION

The method of the present invention is directed towards the production of a composite material which comprises reinforcing fibres embedded in a matrix of a ceramic material.

Throughout this specification the term "ceramic" is intended to include vitreous products as well as crystalline and semi-crystalline products and should be construed accordingly.

The fibres are initially arranged in the particular configuration which is desired in the final composite material. One convenient way of achieving this is to weave the fibres in the desired configuration. However it will be appreciated that other measures could be taken to achieve the desired fibre configuration. Indeed the fibres could be arranged in tows which are subsequently wound on to an appropriately shaped former to produce the desired configuration.

Although the present invention is primarily intended for use with reinforcing fibres, non-fibrous reinforcement could be utilised if so desired. Thus, the present invention is generally applicable to reinforcing media which are porous. The term "porous" used throughout this specification should therefore be construed as embracing both fibrous structures and other porous structures such as foamed materials including foamed ceramics and reticular materials.

The fibres may be formed from any suitable high temperature resistant reinforcing material. Thus they could be formed from a ceramic material such as alumina, silicon carbide or silicon nitride. Alternatively they could be formed from a suitable metal. Generally however, the method of the present invention is particularly useful with fibres which are electrically non-conducting.

Initially a suspension is prepared of small ceramic particles in a suitable liquid vehicle, usually aqueous. The ceramic particles must be sufficiently small to remain in suspension in the liquid vehicle. We have found therefore that is is most convenient to use a sol such as a silica sol or an alumina sol. It is important however, that each of the sol particles should carry a surface charge.

An electrode which is shaped so as to correspond generally in configuration with that of the woven fibres is then placed in the sol. A voltage is applied between the shaped electrode and a further electrode placed in the sol. The polarity of the electrodes is arranged so that the surface charged sol particles are attracted to and deposited upon the shaped electrode by electrophoresis.

It is important that the sol particles deposited upon the shaped electrode should remain in place upon the shaped electrode, even-when the applied voltage is discontinued. To this end, therefore, the particular sol chosen is one which is capable of gelling. Thus the sol particles gel upon deposition and thereby form a self-supporting coating on the shaped electrode. However other means may be employed to ensure that the deposited sol particles form a self-supporting coating. For instance a binder such as polyethylene oxide could be added to the sol so as to be co-deposited with and thereby bind together the sol particles.

When a thin coating of sol particles has been deposited upon the shaped electrode, the applied voltage is discontinued and the shaped electrode is removed from the sol. A matt of the appropriate woven fibres is then applied to the deposited sol particles and the whole assembly is allowed to dry. This effectively tacks the matt in position in the shaped electrode.

The shaped electrode together with its attached matt is then put back into the sol and the voltage re-applied. Further electrophoretic deposition of the sol particles on the shaped electrode then takes place. This time, however, the sol particles have to migrate to the shaped electrode through the fibre matt.

Gradually the deposited sol coating on the electrode builds up in thickness so that eventually it fully permeates or infiltrates the fibre matt. The applied voltage is then discontinued and the shaped electrode together with the permeated fibre matt are removed from the sol. The matt and electrode are then carefully separated.

The permeated matt is then dried and heated at elevated temperature, preferably under pressure, in order to sinter the permeating sol particles and thereby form a ceramic matrix. The thus formed ceramic matrix is thereby reinforced by the fibre matt.

In order to demonstrate the effectiveness of the present invention, the following example was carried out.

A copper electrode in the form of a plate measuring 4 cm×1 cm was immersed in a 30% by weight silica sol. The sol was that which is marketed under the name "Syton 30" by Monsanto and has a pH value of 9.6. A positive voltage of 4 volts was applied to the plate for one minute until a thin coating of gelled silica had formed on the copper electrode surface. The coated electrode was then removed from the sol and a 1 cm square matt of polycrystalline woven alumina was applied to the gelled silica coating. The matt was woven from "Denka" alumina woven fibre type 3026-S. This was satin weave of 0.36 mm thickness and had a weight of 440 grams/m. It had a fill yarn count of 25 and a warp yarn count of 20.

The gelled coating was then allowed to dry, thereby fixing the fibre matt in place on the coating. The copper electrode with its gelled coating and attached fibre matt was then immersed in a fresh sol similar to that used initially. A positive voltage of 4 volts was applied to the copper electrode for three minutes. This caused further sol particle deposition upon the copper electrode, thereby fully permeating the fibre matt. The copper electrode together with its coating and the fibre matt were then removed from the sol and the permeated fibre matt carefully removed from the electrode and dried. Examination using an optical microscope revealed that the fibre matt had been fully permeated by the silica and particles.

The permeated matt was then heated at 1250° C. for two hours followed by two hours at 1400° C. This heat treatment served to sinter the silica sol particles and thereby result in a rigid ceramic matrix material.

It will be appreciated that although the present invention has been described with reference to a single square matt which has been permeated by ceramic particles, the matt could be in the shape of a particular component. Indeed a component could be constructed by producing a number of permeated matts which are stacked on a suitably shaped former and maintained under compression while the sintering heat treatment step is carried out.

Although the present invention has been described with reference to a method of manufacture in which the fibre matt is attached to a deposited sol particle coating prior to its permeation, this need not necessarily be done. All that is necessary during the permeation step is that the fibre matt is sufficiently close to the electrode that as the sol particles build up on the electrode, they progressively permeate the fibre matt.

It may be desirable under certain circumstances to achieve a high density matrix. In order to achieve this, a further densification step is necessary. This can be achieved if the particular sol particles chosen are compression capable of remaining viscous during the compression stage, thereby permitting the use of high loads.

Although the present invention has been described with reference to the use of sol particles which are all of the same material, it may be desirable under certain circumstances to use sols which contain sol particles of different materials. For instance a sol containing both silica and alumina particles could be used.

The method of the present invention is particularly useful in the manufacture of high temperature aerospace component, ceramic tube burners, power generation equipment, furnace components and refractory articles in general.

We claim:

1. A method of manufacturing a composite material characterised in that said method comprises the steps of placing a porous reinforcing medium adjacent an electrode generally corresponding in shape with said porous reinforcing medium, immersing said electrode and said porous reinforcing medium in a suspension of ceramic particles, each of said ceramic particles carrying a surface charge, applying an electric field to said suspension sufficient to cause said ceramic particles to migrate to said electrode through said porous reinforcing medium and continuing the application of said electric field until ceramic particles attracted to said electrode are deposited thereon to such a depth that said deposited particles additional substantially completely permeate said porous reinforcing medium, discontinuing said electric field, taking steps to ensure that said permeating ceramic particles remain in position within said porous reinforcing medium after the discontinuation of said electric field, removing said permeated porous medium from said electrode and from said suspension of ceramic particles and subsequently sintering said permeating ceramic particles within said porous reinforcing medium.

2. A method of manufacturing a composite material as claimed in claim 1 characterised in that said porous reinforcing medium comprises fibres.

3. A method of manufacturing a composite material as claimed in any one preceding claim characterised in that said sintering is carried out whilst maintaining said ceramic particle permeated porous reinforcing medium under compressive loading.

4. A method of manufacturing a composite material as claimed in claim 2 characterised in that said fibres are woven.

5. A method of manufacturing a composite material as claimed in claim 2 or claim 3 characterised in that said fibres are ceramic.

6. A method of manufacturing a composite material as claimed in claim 4 characterised in that said fibres are of alumina.

7. A method of manufacturing a composite material as claimed in claim 6 wherein said sol is a silica sol.

8. A method of manufacturing a composite material as claimed in claim 7 or claim 8 characterised in that said sol is selected to be one which gels upon deposition to thereby ensure that said permeated ceramic particles remain in position within said porous reinforcing medium.

9. A method of manufacturing a composite material as claimed in claim 1 characterised in that said suspension of ceramic particle is a sol.

10. A method of manufacturing a composite material as claimed in any claim 1 characterised in that said suspension additionally contains a binder which is co-deposited with said ceramic particles so as to ensure that said permeating ceramic particles remain in position within said porous reinforcing medium.

11. A method of maufacturing a composite material as claimed in claim 10 characterised in that said compressive loading is uniaxial.

12. A method of manufacturing a composite material as claimed in claim 1 characterised in that said sintering is carried out whilst maintaining said ceramic particle permeated porous reinforcing medium under compressive loading.

13. A method of manufacturing a composite material characterized in that said method comprises the steps of placing a porous reinforcing medium adjacent an electrode generally corresponding in shape with said porous reinforcing medium, immersing said electrode and said porous reinforcing medium in a suspension of ceramic particles, each of said ceramic particles carrying a surface charge, applying an electric field to said suspension sufficient to cause said ceramic particles to migrate to said electrode through said porous reinforcing medium and continuing the application of said electric field until ceramic particles attracted to said electrode are deposited thereon to such a depth that said deposited particles additionally substantially completely permeate said porous reinforcing medium, discontinuing said electric field, ensuring that said electric permeating ceramic particles remain in position within said porous reinforcing medium after the discontinuation of said electric field, removing said permeated porous medium from said electrode and from said suspension of ceramic particles and subsequently sintering said permeating ceramic particles within said porous reinforcing medium, wherein a coating of said ceramic particles is initially applied to said electrode, said porous reinforcing medium being attached to said applied coating so as to be adjacent said electrode prior to said permeation of said porous reinforcing medium.

* * * * *